Feb. 11, 1947.　　　H. A. REINERT　　　2,415,655
LOAD PICK-UP HAND TRUCK
Filed Sept. 21, 1945
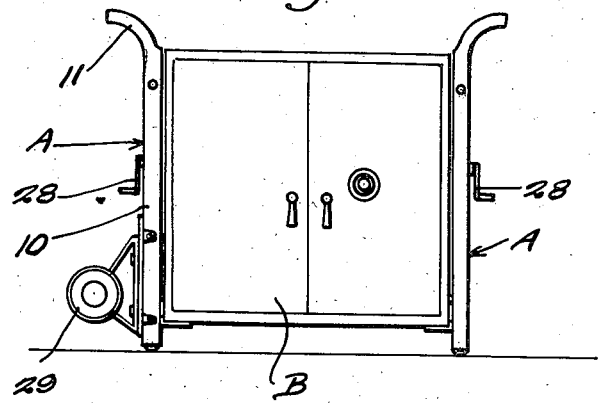
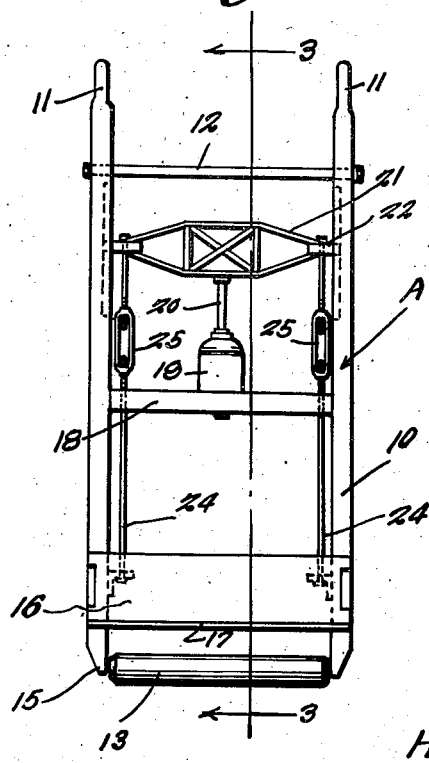
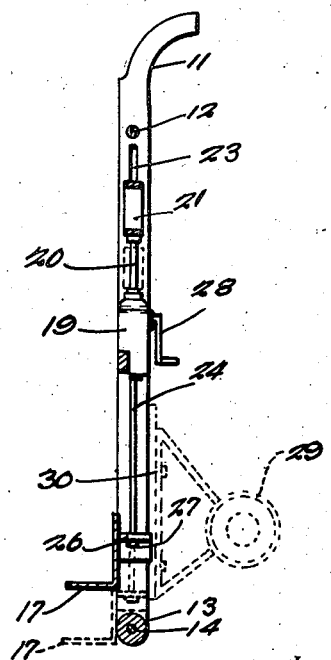
Inventor
Herbert Andrew Reinert
By Clarence A. O'Brien
and Harvey B. Jacobson
Attorneys Patented Feb. 11, 1947

2,415,655

UNITED STATES PATENT OFFICE 2,415,655

LOAD PICKUP HAND TRUCK

Herbert Andrew Reinert, Tulsa, Okla.

Application September 21, 1945, Serial No. 617,779

2 Claims. (Cl. 214—65)

The invention relates to a wheeled hand truck, and more especially to a load pick-up hand truck.

The primary object of the invention is the provision of a truck of this character adapted to pick up a load without the exercise of manual labor for so doing, whereby, through the use of duplicate trucks, the load can be transported from one locality to another with ease and dispatch without excessive manual labor.

Another object of the invention is the provision of a truck of this character which is susceptible of functioning as a jack for raising and lowering a load onto and from the same, the truck being readily portable and so constructed as to preclude damage to a foundation or flooring.

A further object of the invention is the provision of a truck by means of which a load to be carried can be readily tilted in reverse direction with ease, and such load manipulated so that it will pass through a doorway when moving the load from one enclosure to another.

A still further object of the invention is the provision of a truck of this character, which is simple in construction, reliable and efficient in operation, readily and easily handled and adjusted, strong, durable, and inexpensive to manufacture.

With these and other objects in view, the invention consists in the features of construction and combination and arrangement of parts, as will be hereinafter more fully described in detail and illustrated in the accompanying drawing, which discloses the preferred embodiment of the invention, and pointed in the claims hereunto appended.

In the accompanying drawing:

Figure 1 is an elevation of a truck assembly comprised of a pair of trucks in accordance with the invention, showing the assembly supporting a load.

Figure 2 is a plan view of a single truck.

Figure 3 is a sectional view taken approximately on the line 3—3 of Figure 2 looking in the direction of the arrows.

Similar reference characters indicate corresponding parts throughout the several views in the drawing.

Referring to the drawing in detail, the hand truck constructed in accordance with the invention comprises a truck chassis frame A, involving spaced parallel straight side rails 10, which terminate at one end of the frame in curved handle bars 11 and are united to each other next to bars 11 by a cross rung 12, which is made fast thereto in any suitable manner.

Inset in the frame A at the end thereof opposite to the handle bars 11 is a traction roller 13, its axle 14 being journaled in bearing terminals 15 carried by the rails 10.

Slidably fitted to the rails 10 of the frame 8 adjacent to the roller 13 is a lift or pick-up step 16, which is disposed crosswise of such frame and has an outwardly directed lifting shelf or flange 17 constituting a rest for a load such as a safe generally denoted at B in Figure 1 of the drawing.

Approximately mid-way of the frame A and unitary with the rails 10 is a cross supporting member 18 on which is carried approximately centrally of the longitudinal axis of the frame A, a lifting jack 19 preferably of the hydraulic type having its lifting stem or plunger 20 connected to a sliding bridge 21 which at opposite ends 22 movably engages in guide slots 23 provided longitudinally in the inner faces of the rails 10. The bridge 21 next to the rails 10 of the frame A has connected thereto throw rods 24 each having adjustable turnbuckles 25 and both rods 24 being connected at 26 with coupling brackets 27 on the step 16, so that when the jack 19 is operated, the step 16 can be raised and lowered, or moved longitudinally of the frame A, for the picking up of a load from a point of rest onto the truck for the carrying of said load, as best seen in Figure 1 of the drawing.

The jack 19 is controlled by an operating crank 28 manually manipulated so that the load upon the truck can be discharged therefrom or the load lifted on to the truck for the carriage of the same.

Detachably mounted on the frame A of the truck at the rear side thereof is a traction gearing, involving rubber tired wheels, only one of the same being shown and identified at 29 in Figures 1 and 3 of the drawing. The gearing is detachably fastened at 30 to the frame A in any suitable manner and is common to the ordinary hand truck.

In moving heavy loads, as for example, the safe B in Figure 1 of the drawing, two of the trucks of character as hereinbefore set forth, are employed and if desired the traction gearing involving the wheel 29 can be detached from one of these trucks, and the load can be transported bodily by the two-truck assembly, the rollers 13 being in contact with a foundation, whereby such trucks will roll over the foundation for the moving of the load from one point to another. Each hand truck may obviously be used separately or individually as an ordinary hand truck.

The turnbuckles 25 permit increasing of the range of throw of the step 16 or decreasing the throw thereof, as should be obvious.

The truck may be used in any line of work, as for transferring and moving a load and such load can be picked up by the truck from a point of rest and loaded on to the said truck for the transportation of the load from one point to another. The truck can be tilted in reverse direction and is mobile on the roller 13 or the wheels 29.

From the foregoing it will now be seen that there is herein provided a device accomplishing all the objects of this invention, and others, including many advantages of great practical utility and commercial importance.

As many embodiments may be made of the inventive concept, and as many modifications may be made in the embodiment herein shown and described it is to be understood that all matter herein is to be interpreted merely as illustrative and not in a limiting sense.

What is claimed is:

1. A truck of the kind described, comprising a frame, a traction roller inset within one end of the frame for contact with a foundation, a jack carried on the frame, a load lifting step movably fitted to the frame connecting rods between the jack and step for movement of the latter, and adjustable means for varying the effective length of said connecting rods to vary the extent of movement of said step and a removable runner gear on the frame supplementing the roller.

2. A truck of the kind described, comprising a frame, a traction roller inset within one end of the frame for contact with a foundation, a jack carried on the frame, a load lifting step movably fitted to the frame, connections between the jack and step for the adjustment of the latter, connections between the jack and the said step to vary the extent of throw of the latter, and a removable runner gear on the frame and supplementing the roller.

HERBERT ANDREW REINERT.

REFERENCES CITED

The following references are of record in the file of this patent:

UNITED STATES PATENTS

| Number | Name | Date |
|---|---|---|
| 1,520,630 | Bateman | Dec. 23, 1924 |
| 1,035,903 | Raynor | Aug. 20, 1912 |
| 385,181 | Huntly | June 26, 1888 |
| 2,375,720 | Wood | May 8, 1945 |
| 2,369,838 | Minnis | Feb. 20, 1945 |

FOREIGN PATENTS

| Number | Country | Date |
|---|---|---|
| 372,913 | Germany | July 18, 1917 |